United States Patent [19]
Buseth

[11] 3,818,939
[45] June 25, 1974

[54] PETROLEUM TRANSFER SELF-SEALING COUPLING

[75] Inventor: Richard A. Buseth, Jackson, Mich.

[73] Assignee: Aeroquip Corporation, Jackson, Mich.

[22] Filed: Aug. 24, 1972

[21] Appl. No.: 283,622

[52] U.S. Cl. ............................ 137/614.06, 251/340
[51] Int. Cl. ............................................. F16l 37/28
[58] Field of Search..... 137/614.06, 614.02, 614.03, 137/614.04, 614; 251/340, 345, 346, 357, 352

[56] References Cited
UNITED STATES PATENTS

| | | | |
|---|---|---|---|
| 2,519,358 | 8/1950 | Davies | 137/614.06 X |
| 2,665,873 | 1/1954 | Backman et al. | 251/340 X |
| 2,737,401 | 3/1956 | Lindsay | 137/614.06 X |
| 2,837,352 | 6/1958 | Wurzburger | 137/614.03 X |
| 2,898,130 | 8/1959 | Hansen | 137/614.04 X |
| 3,382,892 | 5/1968 | Cerbin | 137/614.02 |
| 3,664,634 | 5/1972 | Guertin et al. | 137/614.06 X |
| 3,710,823 | 1/1973 | Vik | 137/614.06 X |

FOREIGN PATENTS OR APPLICATIONS

| | | | |
|---|---|---|---|
| 670,186 | 4/1952 | Great Britain | 137/614.06 |

Primary Examiner—Alan Cohan
Assistant Examiner—Ira S. Lazarus

[57] ABSTRACT

A coupling for fluid lines in which both coupling halves seal in response to pulling apart of the lines. Separation of the coupling halves occurs suddenly rather than gradually upon the attainment of a predetermined separating force. Coupling is accomplished without force being needed by inserting the nipple half into the manifold half and rotating a union ring. An interlock prevents rotation of the ring if pressure is excessive. A high pressure relief valve on the nipple half prevents damage due to surge pressures. The coupling is especially useful in marine petroleum transfer applications.

5 Claims, 8 Drawing Figures

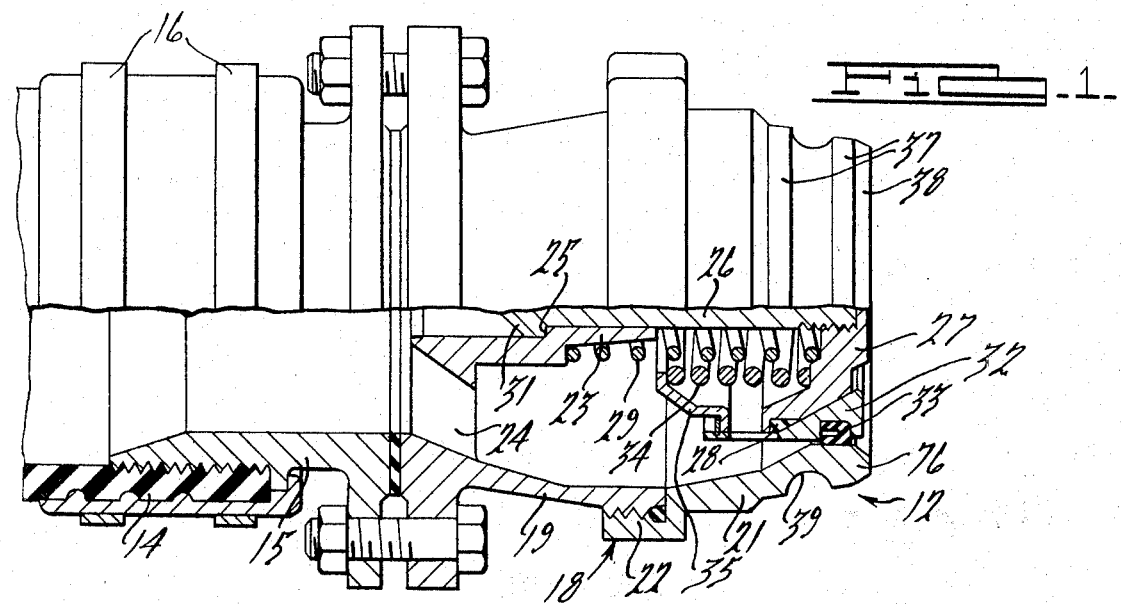
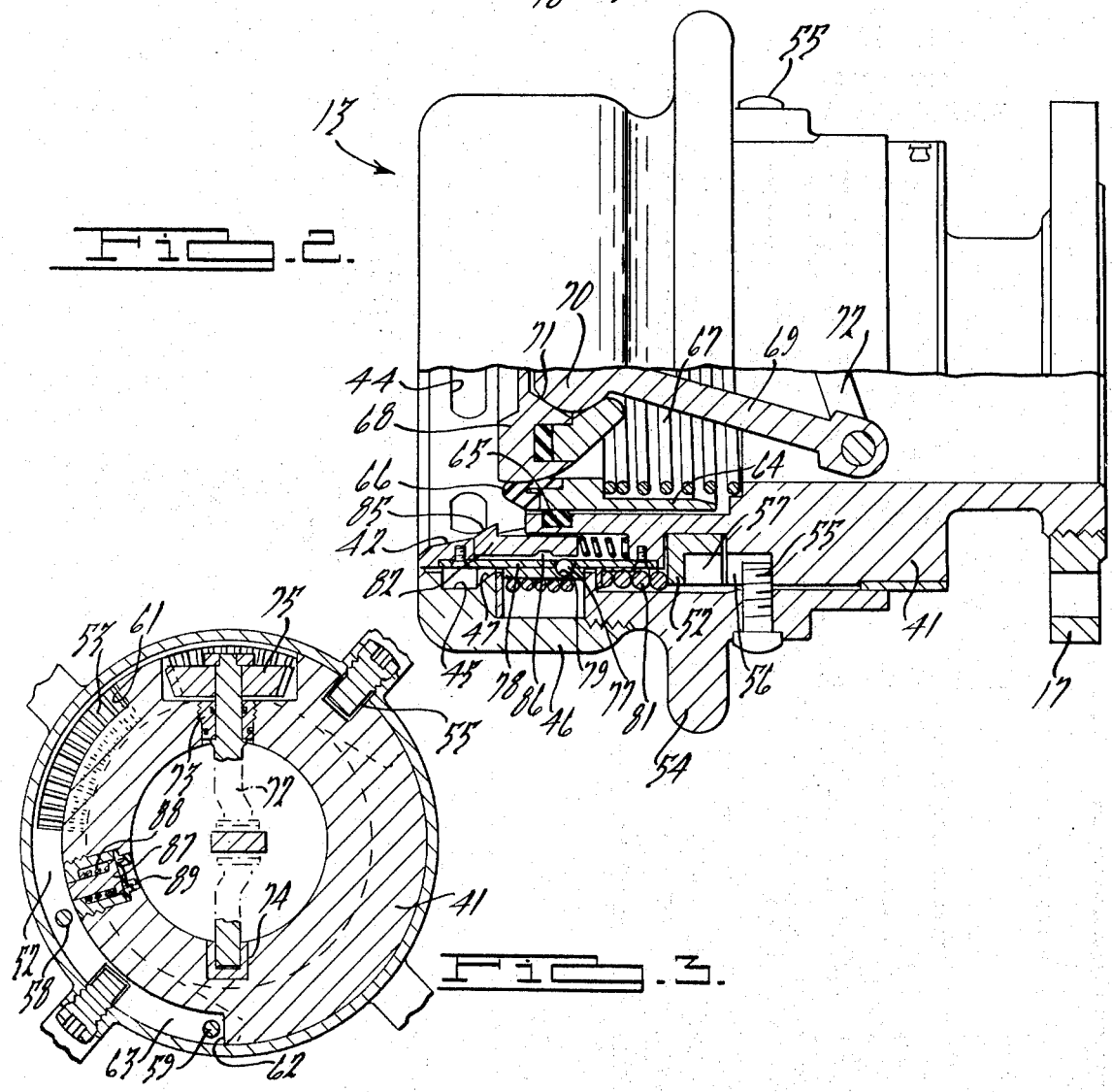

ян3,818,939

PETROLEUM TRANSFER SELF-SEALING COUPLING

FIELD OF THE INVENTION

This invention relates to self-sealing couplings for ship-to-ship and ship-to-shore petroleum transfer which provides an emergency breakaway feature preventing fluid spillage in case of inadvertent separation of the ship from its transfer mooring. In petroleum transfer applications, large diameter pipes are involved, with heavy weights and forces. A ship which breaks or shifts its mooring could cause a separating force at the coupling which gradually increases in strength or is, perhaps, of a pulsating nature. The force could be directed at a substantial angle to the coupling axis.

BRIEF SUMMARY OF THE INVENTION

It is an object of the invention to provide a novel and improved self-sealing coupling adapted for marine petroleum transfer use, which will separate sharply upon the attainment of a predetermined separating force and immediately self-seal both coupling halves to prevent substantial oil spillage.

It is another object to provide an improved coupling of this type which will function in this manner regardless of whether the separating force is at an angle or aligned with the conduits.

It is a further object to provide an improved breakaway coupling of this character which will not open at all until it completely separates and self-seals upon an attainment of a predetermined breakaway force, thus preventing oil spillage which might otherwise occur.

It is also an object to provide an improved coupling of this nature which requires very little manual effort to connect and open the coupling halves but will prevent opening until the halves are fully united.

It is another object to provide an improved coupling of this character which incorporates an interlock to prevent opening or closing of the coupling if pressure is too high, thus preventing injury which could occur to the operator when the opening mechanism is manipulated.

It is the further object to provide an improved coupling with these characteristics, which includes a relief valve in the nipple coupling half to prevent damage due to surge should separation occur with high pressure.

Briefly, the invention comprises nesting first and second coupling halves with first and second valve members and interlocking means to hold the halves together, means for opening both valve members operable only after interlocking the halves, means yielding in response to a breakaway force whereby the interlocking means will suddenly release the halves, and means sealing the valve members of both coupling halves in response to their separation.

BRIEF DESCRIPTION OF THE DRAWINGS

FIG. 1 is a partly sectioned side elevational view of the nipple coupling half showing the relief valve construction.

FIG. 2 is a partly sectional elevational view of the manifold half.

FIG. 3 is a cross sectional view taken along the line 3—3 of FIG. 6 and showing the ring and bevel gears as well as the pressure-sensitive interlock, the view being rotated 180° and taken partly out of plane for descriptive purposes.

DESCRIPTION OF THE PREFERRED EMBODIMENT

Figure 6:
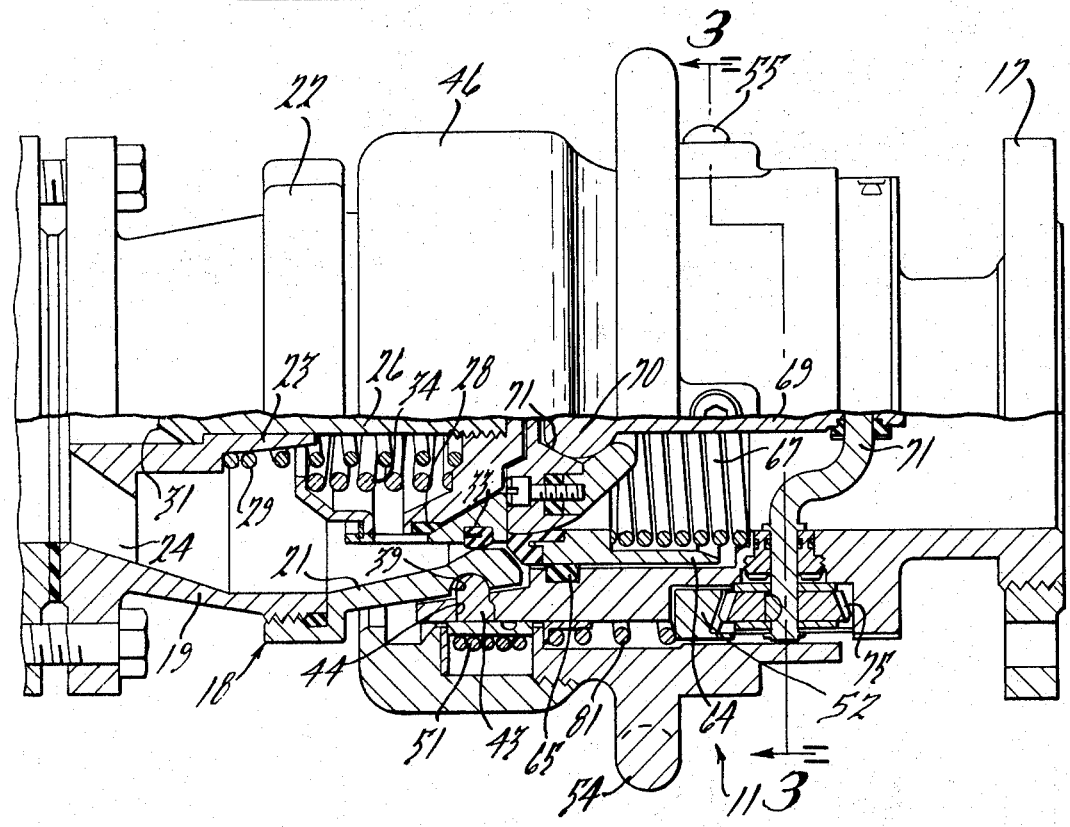
FIG. 6 is a partly sectioned elevational view showing the coupling halves united but still closed.
Figure 7:
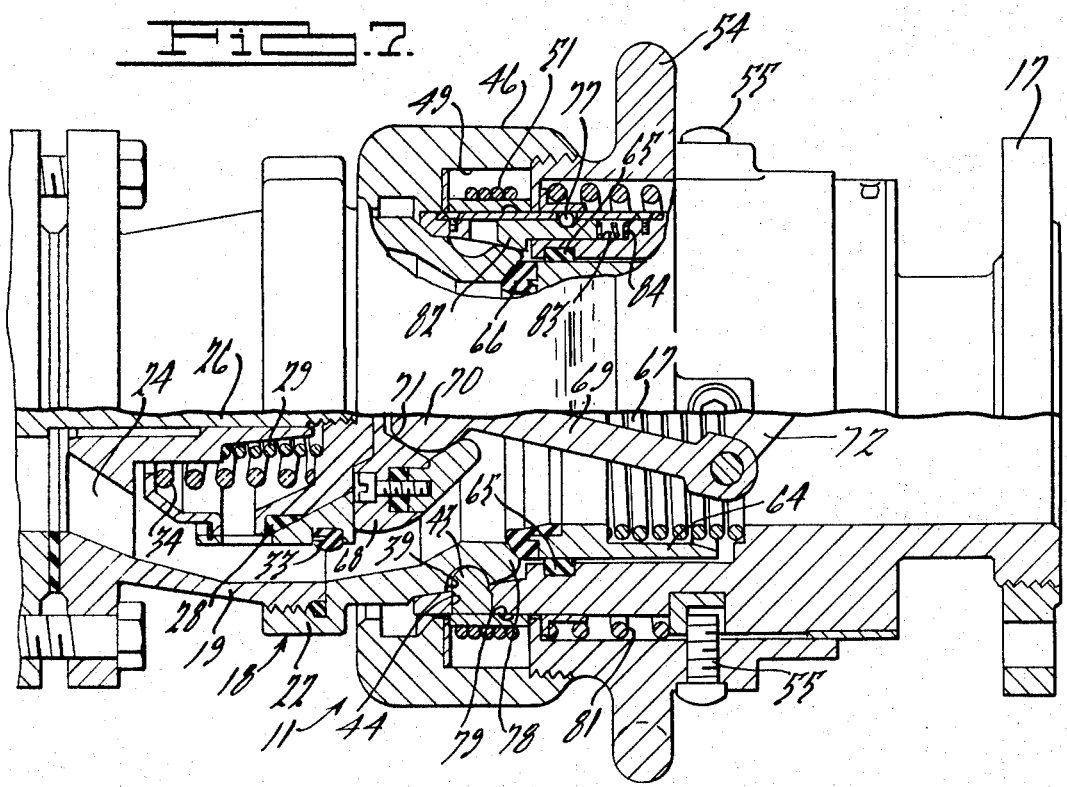
FIG. 7 is a view similar to FIG. 6 but showing the coupling open.

The coupling is generally indicated at 11 in FIGS. 6 and 7 and comprises a nipple half 12 (FIG. 1) and a manifold half 13 (FIG. 2). Ordinarily, the nipple half may be secured to a hose 14 by an adapter 15 hose fittings whereas the manifold half is securable to a manifold (not shown) or other conduit by a flange 17.

The nipple half comprises a housing generally indicated at 18 having two parts 19 and 21 secured together at 22. Section 19 carries a central guide 23 supported by radial arms 24 and having a shoulder 25. A rod 26 is slidably mounted in guide 23 and carries a valve member 27 with a seal 28. Member 27 is urged to its outermost position by a spring 29 disposed between member 27 and guide 23, so that a head 31 on slide 26 will engage shoulder 25.

Valve member 27 and relief valve member 32 have complementary sloping surfaces and a seal 28 which are engaged in the normal position (FIG. 1) urged by a spring 34 between member 27 and a cage 35 carried by member 32. The relief valve has a seal 33 normally engaging the end of the housing portion 21 as urged by the valve member 27 and spring 29. When the coupling halves are connected and opened, both members 27 and 32 will move leftwardly to the position shown in FIG. 7 to open the passage through housing 18. The area of seal 33 is such that when a breakaway occurs and there is sufficient surge pressure in hose 14, member 32 will carry past the limiting position of member 27 (defined by shoulder 25) and momentarily open a passage 36 to relieve the pressure (FIG. 8) until the coupling half is again closed by spring 34.

The portion 37 of housing section 21 is of conical shape and has a tapered portion 38 to facilitate entry into the manifold coupling half. A groove 39 is provided in portion 37 for locking the halves together as will hereinafter appear.

Manifold coupling half 13 comprises a body 41 of generally cylindrical shape having a flared opening 42 complementary to conical surface 37. When portion 37 of coupling 12 is inserted in opening 42, groove 39 will be aligned with a plurality of circumferentially spaced locking dogs 43 radially slidable in apertures 44 of housing portion 42. When coupling half 12 is originally inserted, these dogs will be retracted radially outwardly so as to be disposed in a groove 45 of a locking body 46 surrounding housing 41. The locking body is both rotatable and slidable, the sliding movement being between the unlocking position shown in FIG. 2 and the locking position shown in FIGS. 6 and 7. When sliding from its unlocking to its locking position, a sloping wall 47 on groove 45 will cam dogs 43 inwardly until they engage groove 39. The dogs will then be backed up by a locking ring 48 carried in a recess 49 of body 46.

Figure 4:
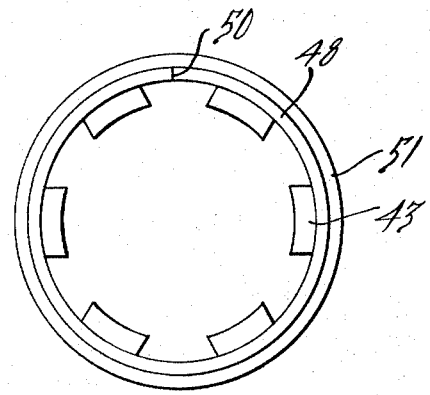
FIG. 4 is a front elevational view of the split lock ring and the spring which surrounds it.
Figure 5:
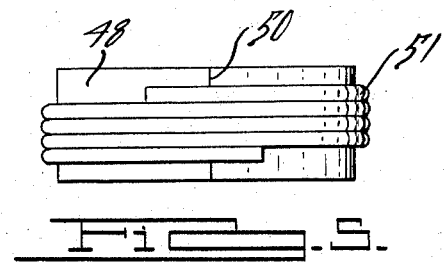
FIG. 5 is a top plan view of the parts shown in FIG. 4.

The construction of locking ring 48 and its associated parts is perhaps best seen in FIGS. 4 and 5. The locking ring is of cylindrical shape and of spring-like material, being split at 50 and normally held in a closed position about housing 41. A spring coil 51 surrounds ring 48. The number of turns of this coil as well as its strength and wire size are chosen so that the coil will hold the ring in its closed position until a predetermined outward radial force is exerted by dogs 43. At this point, the static friction between coil 51 and ring 48 will be overcome and the coil will suddenly open, permitting dogs 43 to move radially outwardly so that the coupling halves can be separated. The complementary surfaces of dogs 43 and groove 39 are sloped so that an axial separating force on the coupling caused, for example, by a ship which has broken its moorings, will be translated into radially outward forces on ring 48. Because of the sloping nature of surfaces 37 and 42, these radial forces will be created regardless of whether the separating forces between the coupling halves are aligned or at an angle. There will be no gradual opening of locking ring 48, and after coupling half 12 has been released, ring 48 will automatically return to its former closed position.

Housing 41 carries a ring 52 with teeth 53 partially around its periphery, as seen in FIG. 3. This ring is rotatable by a union ring 54 secured to locking body 46 after the union ring and locking body have advanced from their FIG. 2 to their FIG. 6 position. When in its FIG. 2 position, union ring 54 is prevented from rotation by a pair of pins 55 which are received by recesses 56 in housing 41. However, when locking body 46 and union ring 54 are advanced to the left (FIG. 6) pins 55 enter recesses 57 in ring 52 so that rotation of union ring 54 will cause toothed ring 52 to rotate. A pair of pins 58 and 59 are carried by a ring 52 and limit rotation of this ring by engaging ends 61 and 62 respectively of a slot 63 in housing 41. Once the union ring is rotated to open the valves it cannot be retracted to disconnect the halves inadvertently, because pins 55 do not line up with recesses 56.

A sleeve 64 is slidable in housing 41 adjacent flared opening 42. This sleeve, which is sealed with respect to the housing by a seal 65 carries another seal 66 at its outer end. Sleeve 64 is urged outwardly (to the left in FIG. 2) by a coil spring 67 disposed between shoulders on the sleeve and housing but is held against outward movement by a valve member 68 of partially spherical shape. The valve member is held against outward movement by a rod 69 carrying a ball joint 70 which fits in a socket 71 on the valve member. The other end of rod 69 is connected to a crank 72 the ends of which are rotatably mounted in bearings 73 and 74 (FIG. 3) carried by housing 41. A bevel pinion 75 is fixed to one end of crank 72 and meshes with teeth 53 on ring 52.

When valve member 68 is retracted, as seen in FIG. 2, crank 72 will extend angularly rearwardly from its axis and spring 67 will urge pin 59 against shoulder 62 through the intermediary of valve member 68, rod 69, crank 72, pinion 75 and ring 52. In order to open valve member 68, that is, move it to the left from its FIG. 2 to its FIG. 7 position, crank 72 must be rotated overcenter. This will be done after locking body 46 and union ring 54 have been moved to the left so that the union ring may rotate toothed ring 52. This leftward movement of valve member 68 will be accompanied by simultaneous movement of sleeve 64 as urged by spring 67. The rotary movement will continue until pin 58 engages shoulder 61. Sleeve 64 will follow valve member 68 only until seal 66 engages lip 76 of nipple coupling half 12 which has been inserted in manifold coupling half 13 (See FIG. 7).

Means are provided for holding locking body 46 and union ring 54 in the retracted or rightward position as shown in FIG. 2 until nipple coupling half 12 has been inserted in manifold coupling half 13, and then automatically releasing members 46 and 54 for leftward movement so that union ring 54 may be rotated to open the coupling. This means includes a plurality of circumferentially spaced balls 77 carried by cages 78 which are set in the forward portion of housing 41. These balls are movable between an outer locking position as shown in FIG. 2 and an inner retracted position as shown in FIG. 7. When in their outer locking position, balls 77 are received by recesses 79 in locking ring 48 which is in its retracted position together with locking body 46 and union ring 54. A coil spring 81 is disposed between toothed ring 52 and the forward portion of union ring 54 and urges locking body 46, union ring 54 and their associated parts to the left in FIG. 2. However, balls 77 will prevent this movement from taking place.

The balls are held in their radially outward position by cocking slides 82 carried by slots 83 in housing 41. These slides are urged axially outwardly (to the left) by coil springs 84 in which position they will hold balls 77 outwardly. The slides have sloping forward surfaces 85 which project inwardly from surface 42 and will be engaged by lip 76 of coupling half 12 when coupling half 12 is inserted in coupling half 13. This will move slides 82 rightwardly, aligning notches 86 thereof with balls 77. The balls will thus be cammed radially inwardly by recesses 79 as urged by spring 81, releasing body 46 and union ring 54 for leftward movement.

A pressure-responsive lock 87 is provided in housing 41 for preventing either opening or closing movement of the coupling parts under excessive pressure. This lock comprises a radially slidable pin urged inwardly by a spring 88 but movable outwardly by the pressure of a diaphragm 89 exposed to the housing bore. Should excessive pressure exist in the bore, pin 87 will be extended into obstructing relation with either pin 58 or 59 depending on the position of ring 52. This will prevent rotation of the toothed ring by union ring 54. Otherwise, as the operator rotates the union ring to turn the valve crank overcenter the pressure could spin the union ring with excessive force.

In operation, assuming an initial condition in which the two coupling halves 12 and 13 are separated, as shown in FIGS. 1 and 2, coupling half 12 will be inserted into coupling half 13. Engagement of lip 76 with slide surfaces 85 will shift the slides rearwardly, permitting balls 77 to move radially inwardly. Spring 81 will shift locking body 46 and union ring 54 to the left until the position shown in FIG. 6 is reached. During this movement, dogs 43 will be cammed inwardly, entering slot 39 to lock the coupling halves together. The dogs will be held in this position by locking ring 48. Both coupling halves will still be sealed. However, union rings 54 will be freed for rotation since ends 55 are withdrawn from recesses 56 and will enter recesses 57 of toothed ring 52.

Rotation of union ring 54 will cause crank 72 to rotate overcenter through teeth 53 and pinion 75. This movement will continue until pin 58 engages shoulder 61. The movement will advance valve member 68 against valve member 32, forcing the latter open to its FIG. 7 position and compressing spring 29. This spring is incapable of again closing the valve members since crank 72 is moved overcenter, so that spring 29 merely urges pin 58 against shoulder 61. Seal 66 will engage lip 76 so that fluid may flow between the coupling halves without leakage.

Let us assume that a breakaway force is exerted between coupling halves 12 and 13. This force could be created, for example, by the shifting of a barge being loaded or unloaded, and could be either in line with the coupling axis or at an angle thereto. The breakaway force will cause the sloping surface of lip 39 to cam dogs 43 outwardly. This will be resisted by locking ring 48 and its reinforcing coil 51, until the static friction between coil 51 and locking ring 48 is overcome. At this point, there will be a sudden radial expansion of ring 48 and dogs 43 will be forced outwardly, permitting coupling half 12 to separate from coupling half 13.

Figure 8:
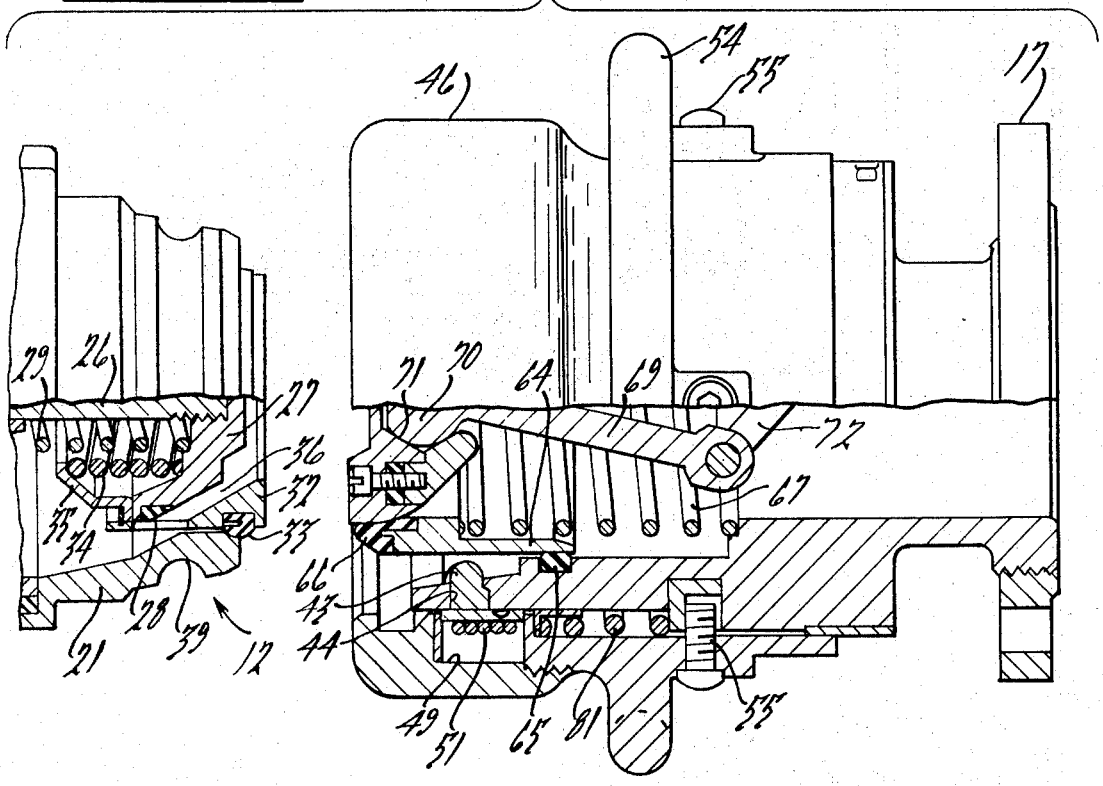
FIG. 8 is a view showing the manner in which the coupling halves seal upon a breakaway force being exerted, this view also illustrating the momentary operation of the relief valve in the nipple coupling half.

As this movement takes place, spring 29 of coupling half 12 will force valve member 27 and relief valve member 32 to the right until seal 33 engages the interior of portion 38 of coupling half 12. This will seal this coupling half against leakage. Should there be a surge pressure in coupling half 12, it will force relief valve 32 momentarily to the right against spring 34, relieving the excessive pressure as shown in FIG. 8. Relief valve 32 will then be returned to its closed position by spring 34.

Meanwhile, as lip 76 is withdrawn from seal 66, sleeve 64 will advance to the left under the action of spring 67 until seal 66 engages partially spherical valve member 68. Thus, manifold coupling half 13 will be sealed. Dogs 43 will be returned via the contraction of ring 48 and the parts of coupling half 13 will remain in their FIG. 8 position. Slides 82 will be prevented from moving leftwardly under the influence of springs 84 until union ring 54 has been rotated so as to retract valve member 68 and sleeve 64. This will permit body 46 and union ring 54 to be manually retracted to the right, since pins 55 will be aligned with recesses 56. When recesses 79 are aligned with balls 77, springs 84 will urge slides 82 to the left to lock body 46 and union ring 54 in its retracted rightward position. Dogs 43 will be free to enter recess 39 so that coupling half 12 may be reinserted at the appropriate time. During this retracting movement of valve member 68, body 46 and union ring 54, manifold coupling half 13 will be sealed against fluid leakage.

Because of the flared shape of complementary surfaces 37 and 42, the breakaway action will be effective as described above regardless of the angularity of the breakaway force. The presence of ball joint 70 supporting valve member 68 will further enhance the effectiveness of the sealing and breakaway actions regardless of the force angles.

I claim:

1. In a self-sealing coupling, first and second coupling halves having complementary nesting surfaces, first and second valve members on said first and second coupling halves respectively, a sleeve slidable in said second coupling half, said second valve member being movable between a closed position in sealing engagement with said sleeve and an open position, interlocking means on said coupling halves holding them in nested position, said interlocking means including circumferentially spaced dogs on one of said coupling halves and yieldable means holding said dogs in locking position within a recess on the other coupling half, said first valve member being movable to its open position in a response to movement of the second valve member to open position after said coupling halves have been locked together, resilient means urging said sleeve into sealing engagement with said first coupling half in response to said opening movement of the second valve member, said yieldable means being responsive to a breakaway force between the coupling halves to suddenly release said dogs from a locking position whereby the coupling halves may be separated, said sleeve being movable into sealing engagement with said second valve member in response to breakaway movement of the coupling halves whereby both said first and second coupling halves will be sealed in response to the breakaway movement, said second coupling half comprising a housing, said dogs being disposed in radial slots in said housing, a locking body surrounding said housing and movable axially between retracted and locking positions, said locking body having a slot with a sloping surface which will cam said dogs inwardly into locking position when the locking body is moved to its locking position, means releasably retaining said locking body in its retracted position and responsive to nesting of said coupling halves to cause the locking body to move to its locking position, said last-mentioned means comprising a spring urging said locking body to its locking position, a plurality of circumferentially spaced ball detents carried by said housing and movable radially between holding and releasing positions with respect to said locking body, slides adjacent said ball detents, resilient means urging said slides axially to a position retaining the ball detents in their holding position, and portions on said slides engageable by said first coupling half when inserted in the second coupling half to move the slides to a position permitting the ball detents to move to their releasing position in response to the urging of said locking body spring.

2. In a self-sealing coupling, first and second coupling halves having complementary nesting surfaces, first and second valve members on said first and second coupling halves respectively, a sleeve slidable in said second coupling half, said second valve member being movable between a closed position in sealing engagement with said sleeve and an open position, interlocking means on said coupling halves holding them in nested position, said interlocking means including circumferentially spaced dogs on one of said coupling halves and yieldable means holding said dogs in locking position within a recess on the other coupling half, said first valve member being movable to its open position in a response to movement of the second valve member to open position after said coupling halves have been locked together, resilient means urging said sleeve into sealing engagement with said first coupling half in response to said opening movement of the second valve member, said yieldable means being responsive to a breakaway force between the coupling halves to suddenly release said dogs from a locking position whereby the coupling halves may be separated, said sleeve being movable into sealing engagement with said second valve member in response to breakaway movement of the coupling halves whereby both said first and second coupling halves will be sealed in response to the breakaway movement, said second coupling half comprising a housing, said dogs being disposed in radial slots in said housing, a locking body surrounding said housing and movable axially between retracted and locking positions, said locking body having a slot with a sloping surface which will cam said dogs inwardly into locking position when the locking body is moved to its locking position, means releasably retaining said locking body in its retracted position and responsive to nesting of said coupling halves to cause the locking body to move to its locking position, means responsive to rotation of said locking body after it has reached its locking position to move said second valve member to its open position, said last-mentioned means comprising a manually rotatable union ring secured to said locking body, interlocking means on said second coupling half housing and union ring when the locking body is in its retracted position preventing rotation of the union ring, a toothed ring rotatably mounted in said housing means interconnecting said union ring and toothed ring in response to movement of the locking body to its locking position, a pinion meshing with said toothed ring, and crank and connecting rod means between said second valve member and pinion.

3. The combination according to claim 2, said connecting rod having a ball joint connection with said second valve member, the second valve member having a partially spherical surface engageable with said sleeve, whereby the seal between said second valve member and sleeve will be maintained despite angular shifting of said second valve member.

4. In a self-sealing coupling, first and second coupling halves having complementary nesting surfaces, first and second valve members on said first and second coupling halves respectively, a sleeve slidable in said second coupling half, said second valve member being movable between a closed position in sealing engagement with said sleeve and an open position, interlocking means on said coupling halves holding them in nested position, said interlocking means including circumferentially spaced dogs on one of said coupling halves and yieldable means holding said dogs in locking position within a recess on the other coupling half, said first valve member being movable to its open position in a response to movement of the second valve member to open position after said coupling halves have been locked together, resilient means urging said sleeve into sealing engagement with said first coupling half in response to said opening movement of the second valve member, said yieldable means being responsive to a breakaway force between the coupling halves to suddenly release said dogs from a locking position whereby the coupling halves may be separated, said sleeve being movable into sealing engagement with said second valve member in response to breakaway movement of the coupling halves whereby both said first and second coupling halves will be sealed in response to the breakaway movement, means for shifting said second valve member between its open and closed positions comprising a rotatable union ring on said second coupling half, crank and connecting rod means between said union ring and second valve member, and means holding said second valve member in its open or closed positions.

5. The combination according to claim 4, said last-mentioned means comprising a toothed ring rotatable with said union ring and driving a pinion connected to said crank means, a spring urging said sleeve against said second valve member when the latter is in its closed position, a first stop on said toothed ring, said last-mentioned spring holding the crank means in an overcenter positioned defined by said first stop, a second stop on said toothed ring limiting movement of said second valve member, and a spring urging said first valve member against the second valve member whereby the crank means will be held in a second overcenter position as defined by the second stop.

* * * * *